US012623839B2

(12) United States Patent
Kappa Venkata et al.

(10) Patent No.: US 12,623,839 B2
(45) Date of Patent: May 12, 2026

(54) SYSTEM AND METHOD FOR CONTROLLING FLAP OF TRASH RECEPTACLE OF AIRCRAFT LAVATORY

(71) Applicant: B/E Aerospace, Inc., Winston Salem, NC (US)

(72) Inventors: Suresh Babu Kappa Venkata, Bengaluru (IN); Srikanth Annumandla, Hyderabad (IN); Ashish Shrikhande, Bangalore (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 590 days.

(21) Appl. No.: 18/080,609

(22) Filed: Dec. 13, 2022

(65) Prior Publication Data

US 2024/0101346 A1     Mar. 28, 2024

(30) Foreign Application Priority Data

Sep. 24, 2022     (IN) ............................ 202211054837

(51) Int. Cl.
| | |
|---|---|
| *B65F 1/14* | (2006.01) |
| *B30B 9/30* | (2006.01) |
| *B30B 15/26* | (2006.01) |
| *B64D 11/02* | (2006.01) |
| *B65F 1/16* | (2006.01) |

(52) U.S. Cl.
CPC .......... *B65F 1/1405* (2013.01); *B30B 9/3046* (2013.01); *B30B 15/26* (2013.01); *B64D 11/02* (2013.01); *B65F 1/1607* (2013.01); *B65F 2210/152* (2013.01); *B65F 2210/168* (2013.01)

(58) Field of Classification Search
CPC .................. B65F 1/1405; B65F 1/1607; B65F 2210/152; B65F 2210/168; B65F 1/1638; B64D 11/02; B30B 9/30456; B30B 15/148; B30B 15/26; B30B 9/3046
See application file for complete search history.

(56) References Cited

U.S. PATENT DOCUMENTS

| | | | | | |
|---|---|---|---|---|---|
| 3,695,172 | A | * | 10/1972 | Cleary | ................. B30B 9/3078 |
| | | | | | 100/98 R |
| 4,620,479 | A | * | 11/1986 | Diamond | ............... B65D 5/323 |
| | | | | | 100/255 |
| 4,729,303 | A | | 3/1988 | Durbin | |
| 5,575,199 | A | * | 11/1996 | Yamamoto | ............ B30B 9/3003 |
| | | | | | 100/255 |

(Continued)

*Primary Examiner* — Jimmy T Nguyen
(74) *Attorney, Agent, or Firm* — SNELL & WILMER L.L.P.

(57) ABSTRACT

Systems, methods, and articles of manufacture for controlling a compression action of a trash receptacle of an aircraft lavatory. Generally, the systems, methods, and articles of manufacture disclosed and described herein facilitate controlled opening and closing actuations of a flap of a trash receptacle of an aircraft lavatory, and a compression action after detection of at least the closing actuation of trash deposits in the trash receptacle to increase the interior volume of the trash receptacle. By controlling the closing actuations of the flap and compression actions of trash deposits, hygiene and sanitation of the lavatory are improved, odors are prevented from dispersing throughout the lavatory and/or cabin of the aircraft, and fire hazards are reduced.

9 Claims, 11 Drawing Sheets

(56)  References Cited

U.S. PATENT DOCUMENTS

| | | | | |
|---|---|---|---|---|
| 7,191,701 | B2 * | 3/2007 | Fukuizumi | B64D 11/02 |
| | | | | 100/215 |
| 9,221,600 | B2 | 12/2015 | Iacobucci | |
| 10,351,337 | B2 * | 7/2019 | McIntosh | B64D 11/02 |
| 2015/0144012 | A1 * | 5/2015 | Frybarger | G06Q 30/0207 |
| | | | | 705/14.1 |
| 2019/0375177 | A1 | 12/2019 | Basso | |
| 2021/0380336 | A1 * | 12/2021 | McIntosh | B30B 9/306 |

* cited by examiner

50

10

590

592 — CONTROLLING BY A CONTROLLER, A LID OF A TRASH RECEPTACLE AND TRASH COMPRESSOR OF AN AIRCRAFT LAVATORY

594 — RECEIVING, BY THE CONTROLLER, AT LEAST ONE OF AN OCCUPANCY STATUS AND A DOOR STATUS OF A DOOR OF THE AIRCRAFT LAVATORY

596 — BASED ON THE AT LEAST ONE OF THE OCCUPANCY STATUS AND THE DOOR STATUS, CONTROLLING BY THE CONTROLLER, THE TRASH COMPRESSOR

SYSTEM AND METHOD FOR CONTROLLING FLAP OF TRASH RECEPTACLE OF AIRCRAFT LAVATORY

CROSS-REFERENCE TO RELATED APPLICATIONS

This application claims priority to, and the benefit of, India Patent Application No. 202211054837 (DAS CODE: A6B3), filed Sep. 24, 2022, and titled "SYSTEM AND METHOD FOR CONTROLLING FLAP OF TRASH RECEPTACLE OF AIRCRAFT LAVATORY," which is incorporated by reference herein in its entirety for all purposes.

FIELD

The present disclosure relates to systems and methods for controlling a flap and compression of trash in a trash receptacle, and in particular for controlling flaps combined with compression actions to compact trash deposits in trash receptacles in aircraft lavatories.

BACKGROUND

Aircraft generally include one or more lavatories for passengers to use during flight. Aircraft lavatories generally include a toilet, a washbasin, and a trash receptacle, among other features. Conventional aircraft trash receptacles include a flap that is manually opened by a passenger to uncover the access opening for the trash receptacle, thereby allowing the passenger to deposit refuse, garbage, rubbish, or other waste products. However, the aircraft lavatory trash receptacles primarily used for disposal hand towels, due to the low density of the material composition of disposal hand towels designed to absorb liquid products, the trash receptacles become quickly filled with trash content of the hand towels in the flight even though a more compressed volume of at least the trash content of hand towels or other paper based drying items could easily be managed and contained by the trash receptacles than is available. Further, some flaps remain open even after the passenger has left the lavatory, due in part to spillage of the hand towels, and passenger reluctance to touch and close the flaps because of fear of contamination. The open flaps allow odors to be emitted from the trash receptacle to fill the lavatory. Additionally, flaps for trash receptacles that remain open for extended periods of time may be a fire hazard.

SUMMARY

In various embodiments, the present disclosure provides a system for controlling compression of trash content of a trash receptacle for an aircraft lavatory. The system may include a carriage assembly coupled to actuator and disposed in a housing of the trash receptacle wherein the housing defines an interior volume to receive trash in the trash receptacle; a plate coupled to the carriage assembly in the interior volume of the housing wherein the plate is configured to conform with a diameter of the interior housing wherein the plate is configured to move from a retract position by the carriage assembly to a variable position in the housing; wherein in response to a command from a controller upon closure of a flap coupled to the housing, the actuator is configured to cause the carriage assembly to vertically move the plate to the variable position to exert a force on a space in the interior volume containing trash that is uncompressed wherein the space is configured between the variable position of the plate and a bottom of the interior volume in the housing wherein the space is reduced by movement of the plate causing the compression action to the trash in the space to cause an increase in space available in the interior volume of the trash receptacle for a subsequent trash deposit.

In various embodiments, the flap is configured to be pivotable between at least an open position and a closed position relative to access an opening of the trash receptacle wherein the actuator is coupled to the flap; and the controller electrically coupled to the actuator, wherein the controller is configured to command the actuator to perform at least one of an opening actuation to pivot the flap to the open position and a closing actuation to pivot the flap to the closed position wherein the controller is configured to command the actuator to perform a first action of the closing actuation in response to a passenger exiting the aircraft lavatory, and to perform a second action via another actuator of the compression action to compress trash in the trash receptacle, to increase space available in the interior volume of the trash receptacle for the subsequent trash deposit.

In various embodiments, the controller is configured to command the actuator to cause the compression action in response to a detection by a lavatory sensor of an ignitable material in the trash deposit in the trash receptacle to deplete a volume of air in the interior volume of the trash receptacle for consumption by the ignitable material.

In various embodiments, the ignitable material comprises a set of ignition sources comprising at least a vaping device, and a cigarette.

In various embodiments, the system further includes a lavatory occupancy sensor electrically coupled to the controller, wherein the controller is configured to command the actuator to move the plate to the retract position after the compression action and to maintain the flap in a closed position in response to the lavatory occupancy sensor reporting vacancy of the aircraft lavatory.

In various embodiments, the controller is configured to command the actuator to perform a closing actuation in response to a door of the aircraft lavatory changing from locked to unlocked and then is configured to command the actuator to perform the compression action for of the trash deposit.

In various embodiments, the system further includes an anti-pinch mechanism that is configured with a threshold indicating a cut-off of the compression action.

In various embodiments, the system further includes a door sensor of the door of the aircraft lavatory, wherein the door sensor is electrically coupled to the controller and the controller is configured to command the actuator to maintain the flap in the closed position until at least a completion of a compression action or in response to the door sensor reporting the door being unlocked.

In various embodiments, the system further includes a proximity sensor electrically coupled to the controller, wherein the controller is configured to determine a false detection from the proximity sensor proximate to the flap of the trash receptacle of an object proximate to the flap of the trash receptacle based on the lavatory occupancy sensor reporting the vacancy of the aircraft lavatory, and is configured to proceed with the compression action of the trash deposit in the trash receptacle when the lavatory is unoccupied.

In various embodiments, the system further includes in response to the controller determining that the force translated to the space containing the uncompressed trash translates to movement of the plate by the carriage assembly less than a pre-determined amount based on a threshold current associated with operation of the anti-pinch mechanism, the controller is configured to cease actuation of the carriage assembly to move the plate to the retract position.

In various embodiments, the carriage assembly comprises one of a linear actuator for operation of the flap, and a ball-and-screw actuator for operation of the plate to move the plate to the variable position.

In various embodiments, the proximity sensor is at least one of an infrared sensor and a photoresistor sensor.

In various embodiments, an article of manufacture comprising a processor and a tangible, non-transitory computer-readable storage medium having instructions stored thereon that, in response to execution by the processor, cause the processor to perform operations is disclosures. The operations comprise closing, by the processor and via an actuator, the flap of a trash receptacle of an aircraft lavatory; and in response to a detection of a closure of the flap of the trash receptacle, compressing, by the processor and via the actuator, by causing a carriage assembly disposed in the trash receptacle to vertically move a plate to a variable position to exert a force on a space in an interior volume of the trash receptacle containing trash uncompressed wherein the space is configured between the variable position of the plate and a bottom of the interior volume in a housing of the trash receptacle is reduced by movement of the plate causing a compression action to the trash in the space to increase space available in the interior volume of the trash receptacle for a trash deposit.

In various embodiments, the operations further comprise receiving, by the processor, an occupancy status of the aircraft lavatory, wherein the closing and compressing is performed in response to the occupancy status changing from occupied to vacant.

In various embodiments, the operations further comprise maintaining, by the processor, the flap of the trash receptacle in a closed position in response to the occupancy status being vacant and retracting the plate to a default position after the compression action.

In various embodiments, the operations further comprise receiving, by the processor, a door status of a door of the aircraft lavatory, wherein the closing and compressing is performed in response to the door status changing from locked to unlocked.

In various embodiments, the operations further comprise performing the compression action in response to the detection by a lavatory sensor of an ignitable material in the trash deposit in the trash receptacle to deplete a volume of air in the interior volume of the trash receptacle for consumption by the ignitable material.

In various embodiments, a method of controlling a compression action of a trash receptacle for an aircraft lavatory is provided. The method includes closing, by the controller and via an actuator, the flap of the trash receptacle of the aircraft lavatory; and in response to a detection of a closure of the flap of the trash receptacle, compressing, by the controller and via the actuator, by causing a carriage assembly disposed in the trash receptacle to vertically move a plate to a variable position to exert a force on a space in an interior volume of the trash receptacle containing trash that is uncompressed wherein the space is configured between the variable position of the plate and a bottom of the interior volume in a housing of the trash receptacle is reduced by movement of the plate causing the compression action to the trash in the space to increase space available in the interior volume of the trash receptacle for a trash deposit.

In various embodiments, the method includes receiving, by the controller, an occupancy status of the aircraft lavatory, wherein the closing and compressing is performed in response to the occupancy status changing from occupied to vacant.

In various embodiments, the method includes maintaining, by the controller, the flap of the trash receptacle in a closed position in response to the occupancy status being vacant; and retracting, by the controller, the plate after the compression action to a retract position.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
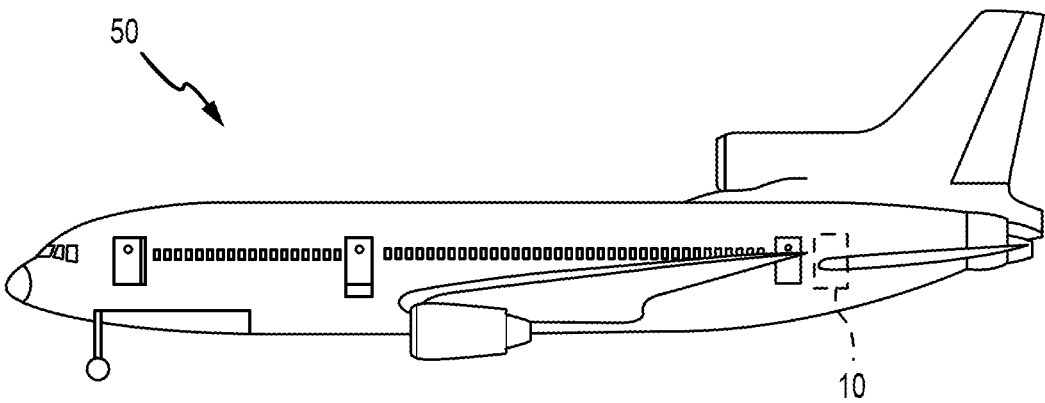
FIG. 1 illustrates an aircraft having a lavatory, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, are systems, methods, and articles of manufacture for controlling a flap of a trash receptacle of an aircraft lavatory. Generally, the systems, methods, and articles of manufacture disclosed and described herein facilitate controlled opening actuation that is restrained using a compaction action of the trash receptacle and closing actuation by gravity of a flap of a trash receptacle of an aircraft lavatory. By controlling the opening and/or closing actuations of the flap, overflow of trash products from the receptacle is prevented and blocking by of the flap operation by trash products is mitigated. Also, hygiene and sanitation of the lavatory are improved, and odors are prevented from dispersing throughout the lavatory and/or cabin of the aircraft, and fire hazards are reduced by closing of the flap and compression of the trash products in the trash receptacle, among other benefits and according to various embodiments. Although numerous details and examples are included herein pertaining to aircraft lavatories, the present disclosure is not necessarily so limited, and thus aspects of the disclosed embodiments may be adapted for performance in a variety of other industries (e.g., trains, vehicles, etc.). As such, numerous applications of the present disclosure may be realized.

Figure 2:
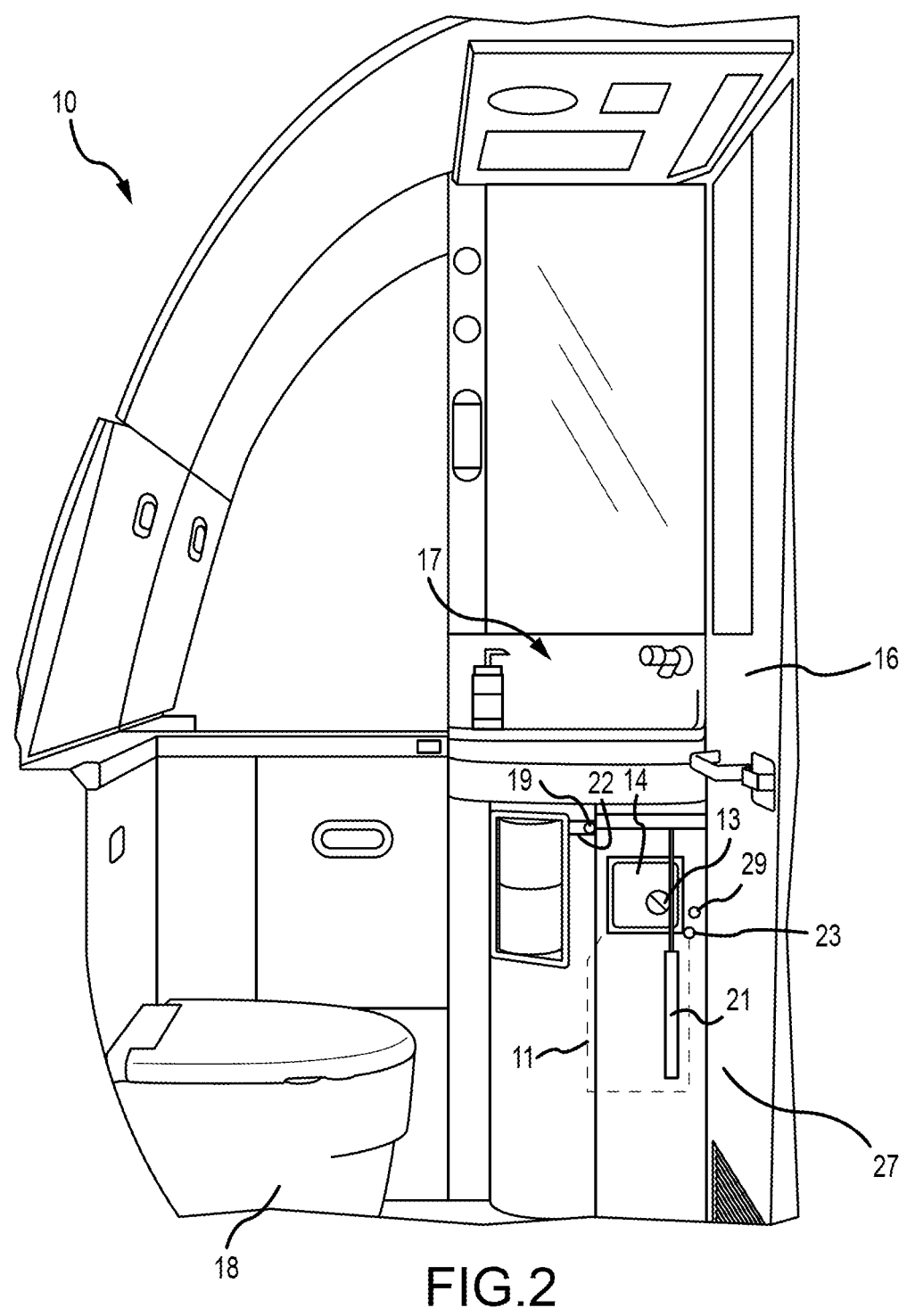
FIG. 2 illustrates a perspective view of an aircraft lavatory, in accordance with various embodiments.

In various embodiments, and referring to FIGS. 1 and 2, an aircraft 50 may include aircraft lavatory 10. The aircraft lavatory 10 may include a trash receptacle 11, a flap 14 for the trash receptacle 11, a door 16, a washbasin 17, and a toilet 18, among other features. The trash receptacle 11 may be defined by, or may be disposed in, a volume defined by a housing, paneling, or a wall section of the aircraft lavatory 10. The housing may also define an access opening 13 to the trash receptacle 11, and the flap 14 may be pivotably, hinged, or otherwise moveably coupled to the housing adjacent the access opening 13, and thereby the flap 14 may selectively cover the access opening 13. For example, the flap 14 may be pivot away from the access opening 13 to allow access to the trash receptacle 11 and may pivot toward and engage the rim of the access opening 13 to close the flap 14 and seal off access to the trash receptacle 11.

In various embodiments, the trash receptacle 11 is configured with a trash compressor 27 that can be installed inside the cavity or volume area of a conventional size and shaped trash receptacle 11 of an aircraft 50. The trash compressor 27 can include a carriage assembly 21 that vertically moves a plate 22 vertically to exert a compression force on trash contents in the trash receptacle 11 to compact and reduce the volume of the trash contents in the trash receptacle 11 and to make space for additional trash deposits. In various embodiments, an indicator 23 may be configured with the trash receptacle 11 to indicate when the capacity of the trash receptacle 11 has reached capacity. In various embodiments, the trash receptacle 11 capacity is sensed by one or more sensors that sense movement of the plate 22 by the carriage assembly 21. For example, a controller controlling an actuator can determine whether force is being exhorted or charged to a space containing trash and whether this exhorted force translates into movement (of a motor) of the plate 22 to reduce the volume of the trash contents in the interior of the trash receptacle 11.

If the force applied does not translate into movement and a minimum threshold distance is not surpassed even though an anti-pinch current threshold is reached the controller can determine that the trash receptacle 11 is filled and using an indicator 23 such as an LED configured with carriage assembly 21 indicate that the trash receptacle 11 is full or the controller can send an alert remotely that the trash receptacle 11 is full. In various embodiments, if a compression action is triggered and the moving carriage (i.e., the carriage assembly 21) cannot move more than a configured distance, then an indicator 23 of a red light on the trash can be illuminated to indicate that the trash content cannot be further compressed or reduced in space and the trash bag needs to be changed.

In various embodiments, a discrete button 29 may be configured with the trash receptacle 11 to enable a crew member or maintenance person, or other user to send a command to the controller to trigger the actuator to cause a compression action to occur.

In various embodiments, and referring to FIGS. 2 and 3A-E, the carriage assembly 21 is provided for controlling the flap 14 of the trash receptacle 11 and the compression actions of trash content for the aircraft lavatory 10.

Figure 3A:
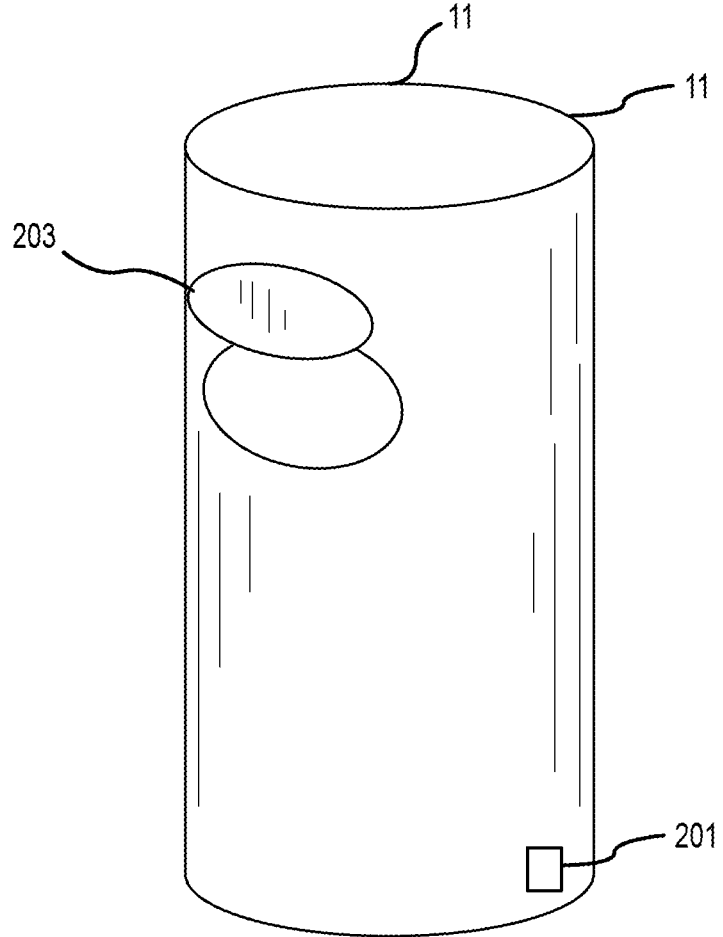
FIGS. 3A, 3B, 3C, 3D, and 3E illustrate a carriage assembly in a housing of a trash receptacle of an aircraft lavatory, in accordance with various embodiments.

In various embodiments, in FIG. 3A, a diagram of trash receptacle 11 configured with a trash flap 203 and a mount rod holder 201 is shown.

Figure 3B:
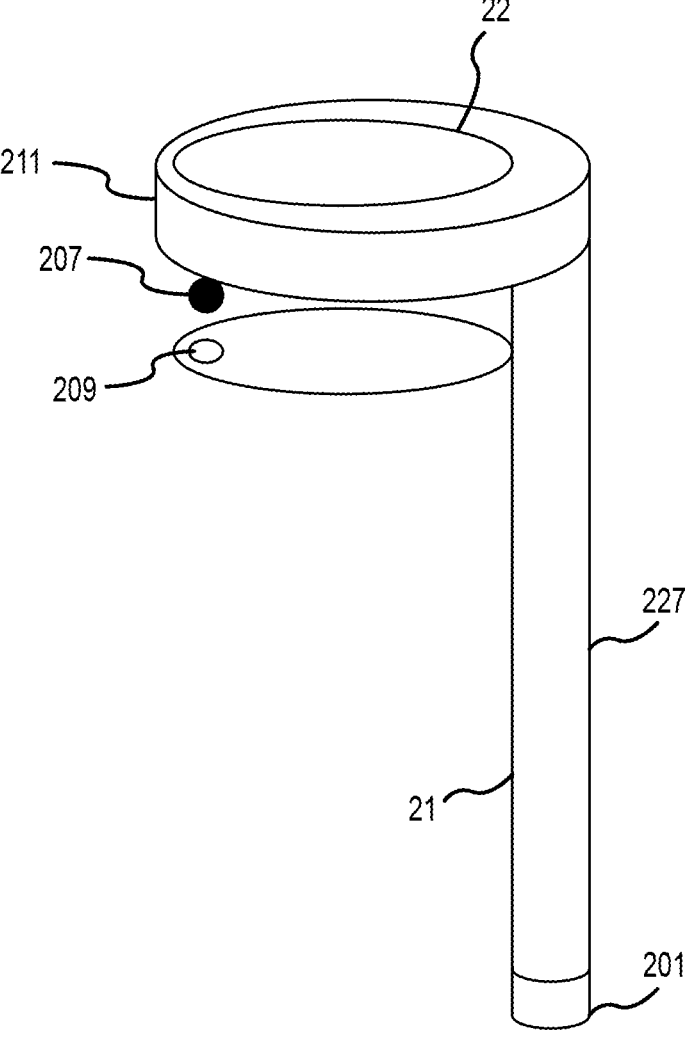
Figure 3C:
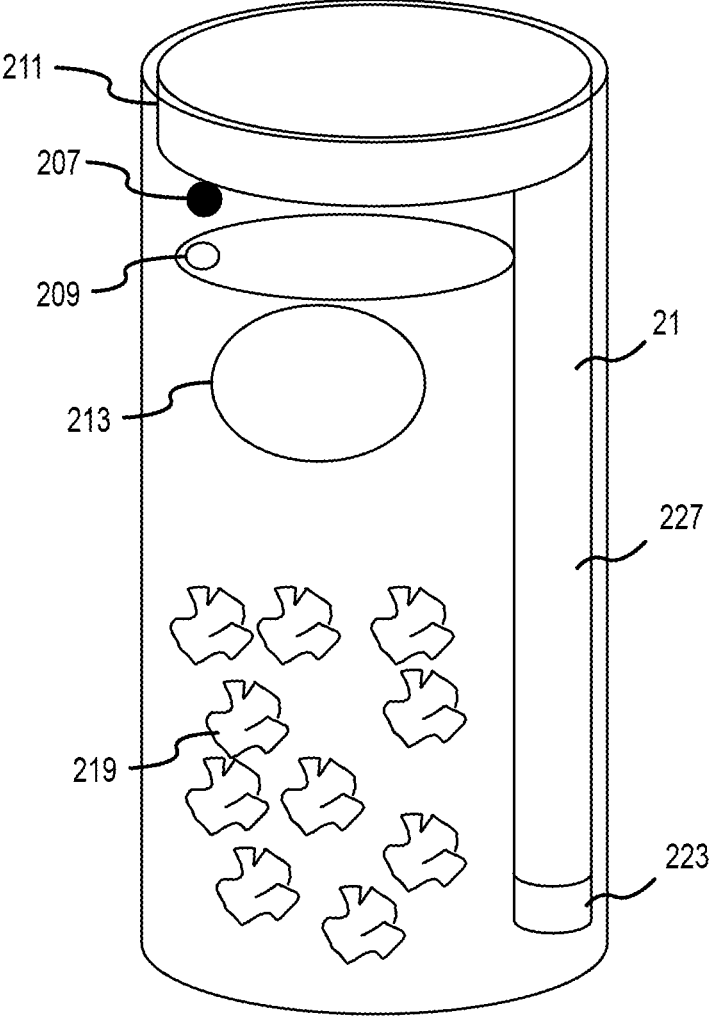
Figure 3D:
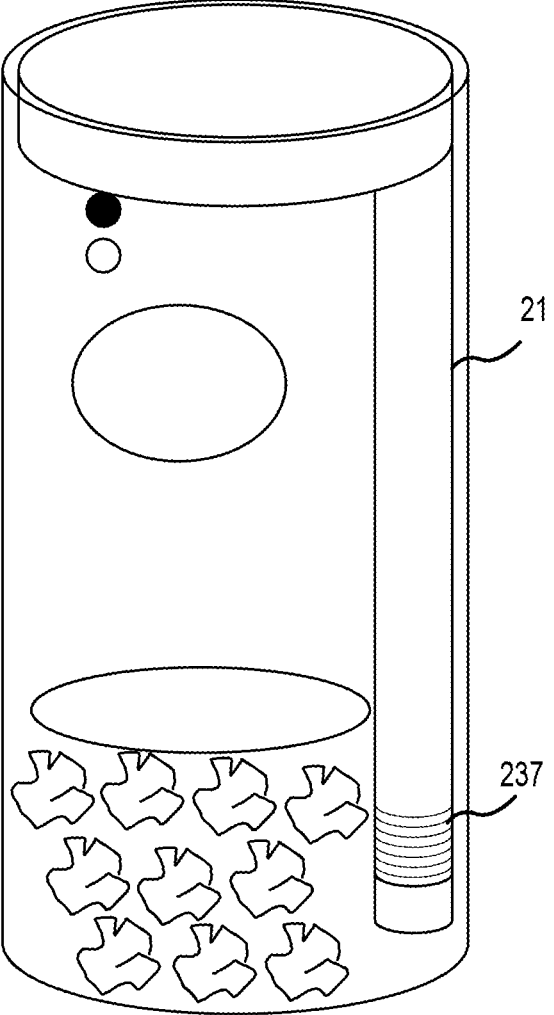

In FIG. 3B, there is shown a trash receptacle that includes a PIR motion and temperature sensor 207, a compressor control system 211 with the plate 22 configured with a micro-controller, power stage board and BLDC motor. Also shown is a hole 209 in the compressor plate for the PIR motion and temperature sensor detection action. Also, the carriage assembly 21 includes a linear actuator 227 covered with a flexible rubber cover. The linear actuator 227 is mounted on the linear actuator mount 223 configured in the trash receptacle 11. FIG. 3C further includes the trash flap 213 closed or in a closed position and trash 219 in the space beneath the plate 22 and carriage assembly 21 that make up the trash compactor system. FIG. 3D further includes a flexible rubber cover at the base of the carriage assembly 21.

Figure 3E:
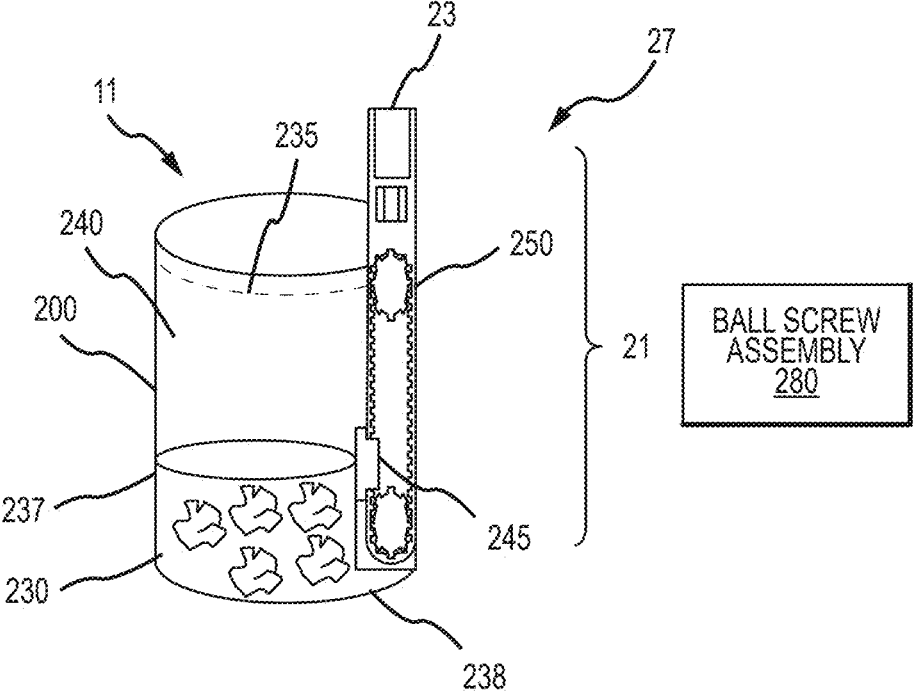

In various embodiments, in FIG. 3E, shows a trash receptacle 11 with an interior volume 240 of a housing 200 where the plate 22 conforms in diameter to the interior volume 240 of the trash receptacle 11.

In various embodiments, the plate 22 is configured to move from a retracted position 235 (i.e., a default position) to a variable position 237 to cause a space 230 that contains the trash 219 deposit to be reduced or compressed by a force applied by movement of the plate 22 towards the space comprising uncompressed trash contents (i.e., the paper towels) to reduce the space and increase the interior volume 240 within the housing 200 of the trash receptacle 11.

In various embodiments, the carriage assembly 21 can be configured to use a linear actuator (belt drive, screw drive linear actuator, etc.) that is covered with the flexible rubber cover (See FIG. 3C) with a moving carriage part attached to the plate 22. The plate 22 is configured to be, in various embodiments, of a size of the diameter of the trash receptacle 11 and configured of a plastic, steel, aluminum or other alloy or composite material that can withstand repetitive compressive loads applied in compression actions to cause compacting and reductions in volumes of the space occupied by the uncompressed trash in the interior volume 240 of the trash receptacle 11 (i.e., the plate is configured of material with sufficient strength to bear the weight of the volume compression).

In various embodiments, the space 230 between the plate 22 and the bottom 238 of the housing 200 of the trash receptacle 11 is compressed by the compression action from actuations either manually or automatically to cause more space to be available of the interior volume 240 for trash deposits.

In various embodiments, in a manual maintenance or by an automated process, when a compression action by the trash compressor 27 is triggered by a controller to actuate the linear actuator, the moving carriage part 245 to which the plate 22 is attached compresses (i.e., the compression action is initiated), the trash contents found or located towards the bottom 238 of the trash receptacle 11. If a controller controlling the actuator determines that though a configured force being exerted on the trash contents in the space 230 does not translate to the movement of the motor 250, the controller ceases operation of the actuator and retracts the plate 22 back to its original default or retracted position.

In various embodiments, the carriage assembly 21 is configured as a ball screw assembly 280 attached to the plate 22 and can lower and raise the plate 22 in the housing 200 of the trash receptacle 11.

Figures 4A, 4B, 4C:
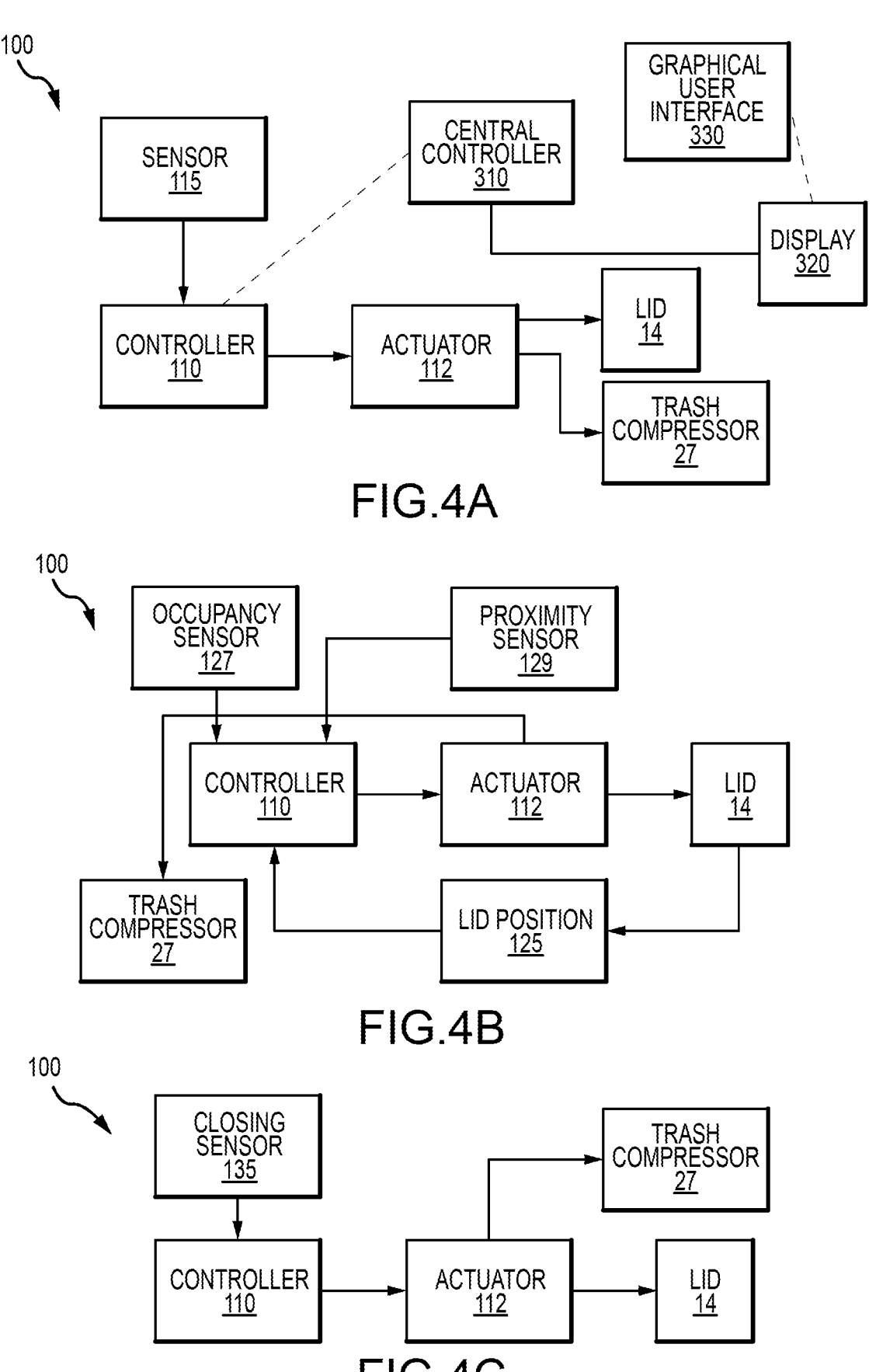
FIG. 4A is a schematic block diagram of a system for controlling a flap and trash compressor of a trash receptacle of an aircraft lavatory, in accordance with various embodiments.
FIG. 4B is a schematic block diagram of a system for controlling a flap and trash compressor of a trash receptacle of an aircraft lavatory, in accordance with various embodiments.
FIG. 4C is a schematic block diagram of a system for controlling a flap and trash compressor of a trash receptacle of an aircraft lavatory, in accordance with various embodiments.

In various embodiments, and referring to FIGS. 2-3 and 4A, a system 100 for controlling the flap 14 with the compression action of the carriage assembly 21 of the trash receptacle 11 for the aircraft lavatory 10 is provided. The system 100 may include the housing 200 that defines the volume/space (i.e., interior volume 240) for the trash receptacle 11 and the access opening 13. In various embodiments, the system 100 also includes the flap 14 pivotably coupled to the housing adjacent the access opening 13. In various embodiments, the system 100 further includes an actuator 112 coupled to the flap 14, the actuator (actuator 227 of FIG. 3C) couples to a trash compressor 27, and a controller 110 electrically coupled to the actuator 112. In various embodiments, both actuators (112, 227) are electrically coupled to the controller 110 are disposed in the compressor control system 211 (in FIG. 3B). Generally, the controller 110 may be configured to command the actuator 112 to perform an opening actuation to pivot the flap 14 to an open position (from a closed position) and/or to perform a closing actuation to pivot the flap to the closed position (from the open position), and when the flap 14 is in the closed position to perform a compression action by actuation of the trash compressor 27 and movement of the plate 22 to compress the trash contents in in the space 230 between the plate 22 at the variable position 237 and the bottom 238 of the housing 200.

The flap 14 may pivot about a top edge, a bottom edge, or a lateral side edge of the access opening. Additionally, the flap 14 may pivot inward or outward relative to the access opening 13. The actuator 112 may include one or more levers or straps connected to the flap 14, and the actuator 112 may include one or more rotational or linear mechanisms powered, for example, by a direct current power supply from the aircraft 50. The "actuator" 112 generally refers to devices, structures, and mechanisms that effectuate movement of the flap 14 in response to commands from the controller 110.

In various embodiments, the system 100 may include one or more sensors 115 to trigger the opening of the flap 14 when the trash compressor 27 is not actuated and the plate 22 has returned or is in a retract position 235. Sensor 115 may be configured to receive or detect a condition, and this received/detected condition may be passed to the controller 110 to initiate the opening actuation via the actuator 112. In various embodiments, the sensor 115 may include a mechanism with which a passenger occupying the aircraft lavatory 10 may interact. For example, the sensor 115 may be a button 19 (FIG. 2) in the aircraft lavatory 10 that a passenger may press to cause the flap 14 to open. The button 19 may be in electric communication with the controller 110, and upon receipt by the controller of a signal indicating a button-push, the controller 110 may control the actuator 112 to perform the opening actuation to open the flap 14. The controller 110 may be configured to keep the flap 14 open for a predetermined period after the button-push, or the controller 110 may be configured to close the flap 14 in response to a subsequent button-push. Thus, pressing the button 19 may toggle the opening/closing of the flap 14. After closure of the flap 14, the controller may be configured to wait a predetermined time for either the lavatory to be unoccupied or the door mechanism to be unlocked to initiate the actuation of a command to cause the compression action of the trash contents in the space 230 of the interior volume 240 of the trash receptacle 11.

In various embodiments, the sensor 115 is a proximity sensor. The proximity sensor may be mounted adjacent the flap 14 and may be electrically coupled to the controller 110. The proximity sensor may detect and report when/if an object, such as a hand of a passenger, is proximate the flap 14, and this detected condition may be passed to the controller 110 to command the actuator 112 to perform the opening actuation to open the flap 14. The proximity sensor may be an infrared sensor (e.g., a passive infrared sensor), a photoresistor sensor (e.g., a light decreasing resistor), an ultrasonic sensor, and/or a gesture sensor. The closing actuation may be performed in response to the proximity sensor no longer detecting an object proximate the flap 14. In various embodiments, the controller 110 may be configured to have a predetermined delay period, thus allowing the flap 14 to may remain open for a period after the object is removed from being proximate the flap 14.

In various embodiments, the controller 110 may be configured to be in communication with a central controller 310 configured with a display 320 for displaying a graphical user interface 330 that depicts real-time images of trash receptacles in aircraft lavatories in the aircraft 50 and the current capacities of each of the trash receptacles. In various embodiments, the graphical user interface 330 may include alerts that sense conditions indicative of an ignition material as trash deposits, a trash receptacle 11 at capacity, and an emergency trash compression action to delete/remove available oxygen or air content in the space 230 containing ignitable contents of a trash receptacle 11 to prevent a fire hazard or the like (i.e., ignitable contents like cigarettes, vaping device, smoking paraphernalia, matches, or other ignitable).

In various embodiments, and referring to FIG. 4B, the system 100 may further include a flap position sensor 125. The flap position sensor 125 may be electronically coupled in feedback providing communication with the controller 110 pertaining to the position of the flap 14. The flap position sensor 125 may be operably coupled to the flap 14 and may be configured to detect a position of the flap 14 relative to the access opening 13 and may report back to the controller 110 the position/status of the flap 14. In various embodiments, the flap position sensor 125 facilitates failure detection and corresponding correction.

In various embodiments, the controller 110 receives input from an occupancy sensor 127 and a proximity sensor 129 and the flap position sensor 125. The controller 110 determines based on the input from the occupancy sensor 127 (whether the lavatory is unoccupied) to command the actuator 112 to actuate the trash compressor 27. In various embodiments, if the proximity sensor determines there is an object near the trash receptacle 11 but the occupancy sensor 127 determines that the lavatory is unoccupied, this is determined by the controller 110 to be a false detection and the trash compressor 27 is commanded by the controller 110 via the actuator 112 to perform a compression action after the lavatory is deemed unoccupied from input from the occupancy sensor 127. In various embodiments, the controller 110 commands the trash compressor 27 to perform a compression action when the flap position sensor 125 is closed after the lavatory is unlocked or after a time delay or after the proximity sensor 129 detects no object near the flap 14. The controller 110 is configured to perform compression actions based on input from several sensors 115 and to make determinations based on the lavatory being occupied or not, and the flap 14 of the trash receptacle being open or not to actuate a compression action by the trash compressor 27.

In various embodiments, and referring to FIG. 4C, the system 100 may further include one or more closing sensors 135. As used herein, the term "closing sensor(s)" refers to sensors that facilitate closure of the flap 14 without intentional action from the passenger. As opposed to the button and/or proximity sensors described above referring to FIG. 4A (sensor 115) which are triggered by deliberate and intentional action by the passenger/occupant to engage with the sensors 115, the closing sensors 135 are configured to detect conditions in/of the aircraft lavatory 10 that result in the flap 14 being automatically closed (via the controller 110 and the actuator 112) without deliberate/intentional action from the passenger.

In various embodiments, the closing sensors 135 include one or more occupancy sensors and/or one or more door sensors. The closing sensor 135 may be an occupancy sensor configured to detect whether a passenger is in the aircraft lavatory and/or whether a passenger is leaving the aircraft lavatory. The closing sensor 135 may be a door sensor configured to detect a position/state of the door 16 (FIG. 2) of the aircraft lavatory 10 (e.g., whether the door is locked or unlocked). The closing sensor 135 may be electrically coupled to the controller 110 to provide the functionality described immediately below.

In various embodiments, closing sensor 135 may detect a passenger exiting the aircraft lavatory, and the controller 110 may be configured to command the actuator 112 to perform the closing actuation in response. In various embodiments, the controller 110 is configured to command the actuator 112 to maintain the flap 14 in the closed position in response to the aircraft lavatory being vacant (as detected by the closing sensor 135, which may an occupancy/door sensor). For example, the controller 110 may be configured to command the actuator 112 to maintain the flap 14 in the closed position in response to a lavatory occupancy sensor reporting vacancy of the aircraft lavatory.

In various embodiments, closing sensor 135 detects a condition of the door 16 to the aircraft lavatory 10. The closing sensor 135 may detect the condition of the door 16 changing from locked to unlocked, and the controller 110 may thus command the actuator 112 to perform the closing actuation in response. In various embodiments, the controller 110 is configured to command the actuator 112 to maintain the flap 14 in the closed position in response to the door 16 to the aircraft lavatory 10 being unlocked. For example, the controller 110 may be configured to command the actuator 112 to maintain the flap 14 in the closed position in response to a door sensor reporting the door being unlocked and to command operation by the trash compressor 27 of the compression action. In various embodiments, the flap 14 is maintained in a closed position by the controller 110 until a compression actuation is completed or if the occupancy sensor (i.e., proximity sensor in the lavatory) detects any activity in the activity; in which case, the controller 110 is configured to immediately or abruptly cease a compression action and retract the plate to its default position and then enable an action to open the flap 14 that is in its closed position.

In various embodiments, the features of FIGS. 4A, 4B, and 4C may be combinable with each other in various manners. The system 100 may include one or more sensors 115 described above referring to FIG. 4A (pertaining to opening/closing the flap via intentional action by the passenger). Additionally, the system 100 may include the flap position sensor of FIG. 4B, and/or the system 100 may include one or more of the closing sensors 135 described above referring to FIG. 4C.

In various embodiments, the controller 110 may be integrated into computer systems onboard the aircraft, or the controller may be a standalone controller. In various embodiments, the controller 110 comprises a processor. In various embodiments, the controller 110 is implemented in a single processor. In various embodiments, the controller 110 may be implemented as and may include one or more processors and/or one or more tangible, non-transitory memories and be capable of implementing logic. Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. The controller 110 may comprise a processor configured to implement various logical operations in response to execution of instructions, for example, instructions stored on a non-transitory, tangible, computer-readable medium configured to communicate with the controller 110.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the controller 110 may be, or may be incorporated into, an article of manufacture. Thus, the terms "controller" and "article of manufacture" may be used interchangeably herein. The article of manufacture may include a processor and a storage medium/memory, as described above. The processor of the article of manufacture may execute instructions to perform various operations.

Figure 5:
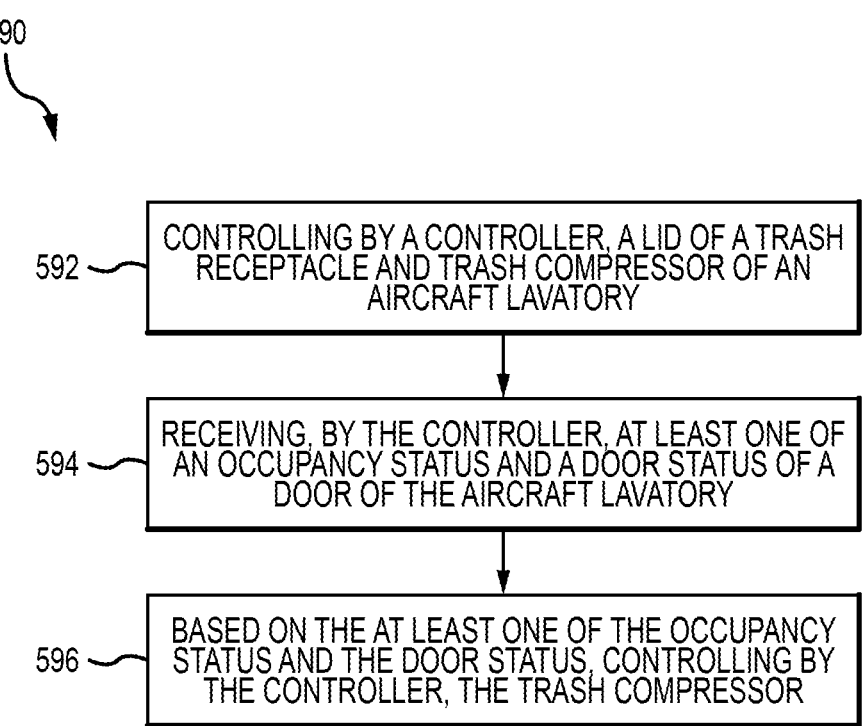
FIG. 5 is a schematic flow chart diagram of a method of controlling a flap and trash compressor of a trash receptacle of an aircraft lavatory, in accordance with various embodiments.

The various operations performed by the processor are as shown in FIG. 5, according to various embodiments. FIG. 5 shows a schematic flow chart diagram of a method of controlling a flap and trash compressor of a trash receptacle of an aircraft lavatory. The method 590, and thus the operations performed by the processor, may include, controlling closure, by the processor, the flap 14 and then initiating a compression action by the trash compressor of the trash receptacle 11 of the aircraft lavatory 10 at step 592. The method 590 may further include closing, by the processor, the flap 14 of the trash receptacle 11 of the aircraft lavatory 10 at step 596 and initiating action of the trash compressor 27 when a false detection is received by a proximity sensor configured with the trash receptacle 11 of an object at the flap 14 of the trash receptacle 11. In various embodiments, the method 590 also includes receiving, by the controller, at least one of an occupancy status of the aircraft lavatory and a door status of a door of the aircraft lavatory at step 594. In various embodiments, step 596 is based on step 594, in that the occupancy status and/or the door status determines whether the flap 14 is closed before actuation of the trash compressor 27 and compression actions.

In various embodiments, closing the flap 14 and trash compressor 27 compression action is performed in response to the occupancy status changing from occupied to vacant. In response to the controller 110 receiving an input indicating that the occupancy status of the aircraft lavatory 10 has changed from occupied to vacant, the processor of the controller 110 may send commands to the actuator to close the flap 14 of the trash receptacle 11 and perform the trash compression action. In various embodiments, the operations further include maintaining, by the processor of the controller 110, the flap 14 of the trash receptacle 11 in the closed position in response to the occupancy status being, and/or remaining, vacant, and after the trash compression action returning the plate by the carriage assembly to a retract position 235 (from the variable position 237).

Figure 6A:
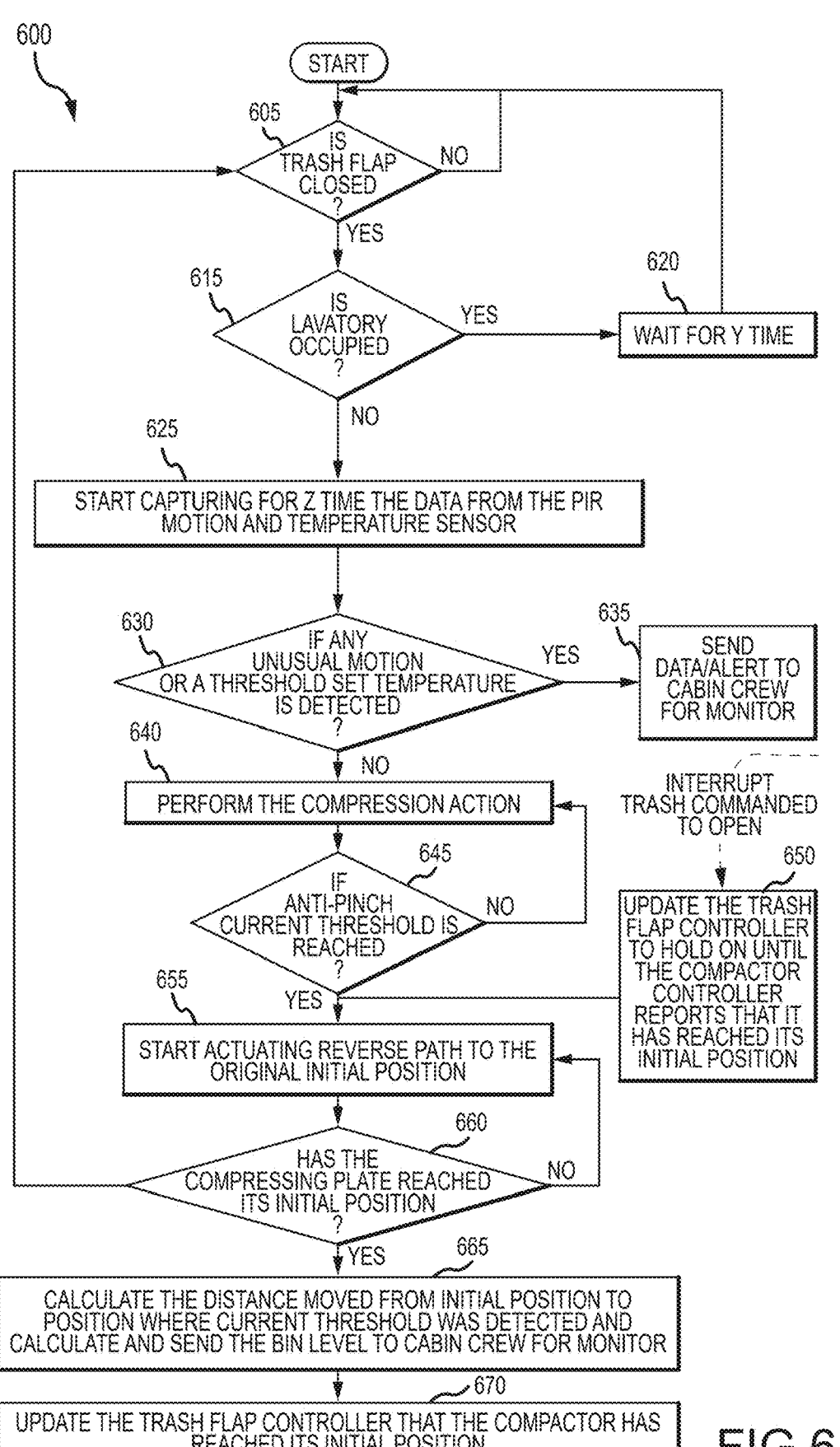
FIGS. 6A and 6B are a schematic flow chart diagram of a method of automatically and manually controlling a flap and trash compressor of a trash receptacle of an aircraft lavatory, in accordance with various embodiments.
Figure 6B:
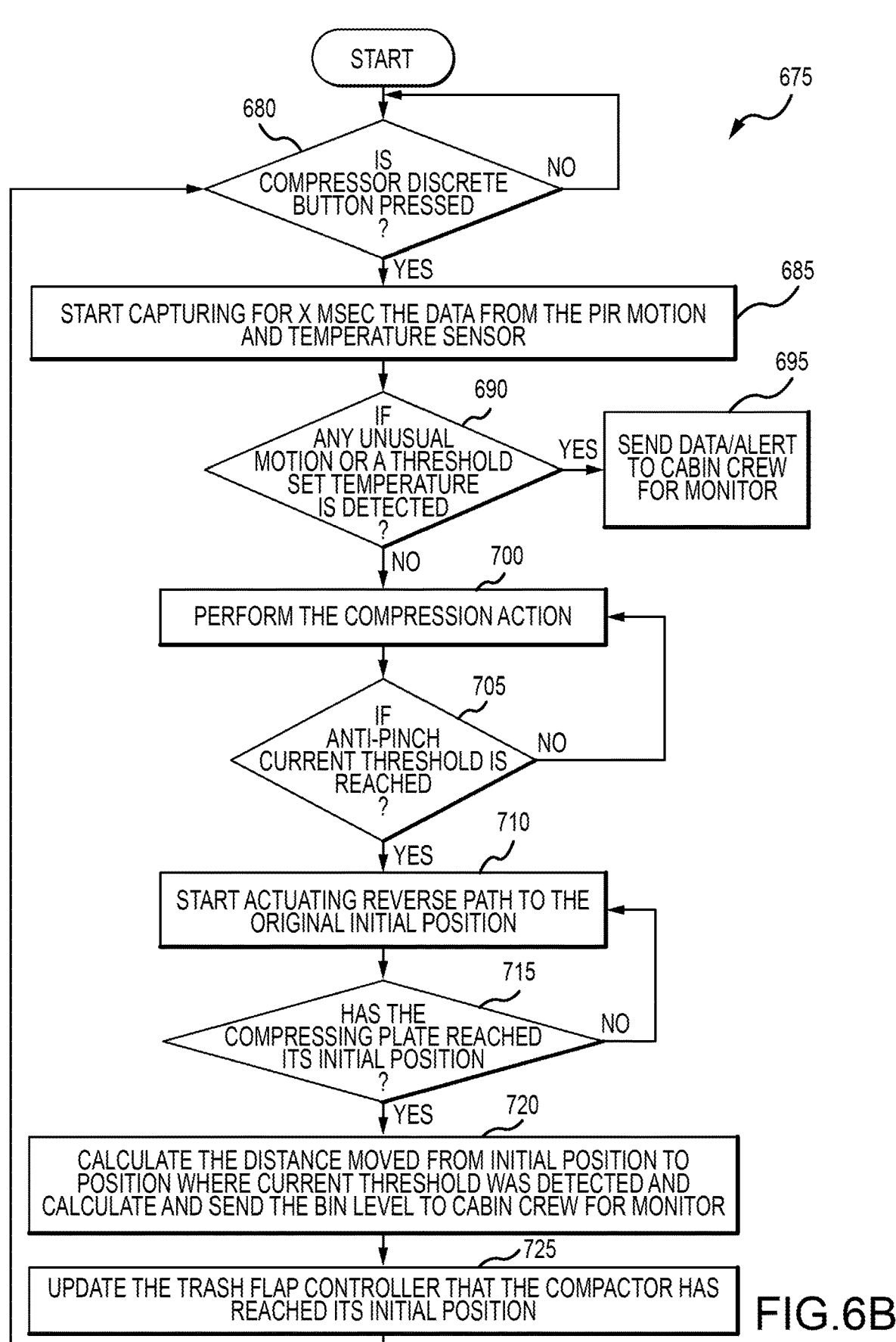

In various embodiments, closing the flap 14 is performed as well as the trash compression action in response to a door status of a door of the aircraft lavatory 10 changing from locked to unlocked. In response to the controller 110 receiving an input indicating that the door status has changed from locked to unlocked, the processor of the controller 110 may send commands to the actuator 112 to close the flap 14 and then perform trash compression action (even if a false detection is received by a proximity sensor in the lavatory). In various embodiments, the operations further include maintaining, by the processor, the flap of the trash receptacle in a closed position in response to the door status being unlocked and the trash compressor 27 is kept in a default state and the plate returned to its retract position 235. FIGS. 6A and 6B show flowcharts for automatic and manual operations of the trash compressor system in accordance with various embodiments. In FIG. 6A, in flowchart 600, at step 605, a determination is made as to whether the flap to the rash receptacle is closed or not. If it is closed, then at step 615 the lavatory is checked for occupancy by data from a plurality of sensors from the soap sensor, toilet seat, toilet cover that is collected from controllers associated with each unit and action states are determined as to the states of operations of each unit. If the action states show likelihood of use (i.e., user detection) then the system returns to a waiting mode 620 (returns to step 605), else it makes the determination that there is no use (and the no use or detection of a lavatory occupant use has not occurred for a predetermined time). In various embodiments, multiple sensors can detect the occupancy of a user in the lavatory, In various embodiments, the trash flap opens by actuator controlled by a controller but closes by gravity. The controller may also be configured to restrain the flap (i.e., keep it closed) from an open position even if user force is applied to open the flap as the controller can be configured with in instruction that the flap is to be closed during an ongoing compression action as a safety pre-caution (i.e., inadvertent insertion of a user hand into the trash receptacle via an open flap). Hence, during the compression action, the controller is configured to restrain an open flap and to cause the compression plate to retract to its original position and then enabling the flap to be automatically opened. Next, at step 625 the system captures data for a certain time from the PIR motion and temperature sensor. If at step 630, unusual motion outside a norm or threshold temperature, an alert or notification corresponding to the unusual activity to the crew or issued on a monitoring system is initiated at step 635 to cause the crew to follow up to ensure there is not a safety, malfunction or other compliance issue with the trash compressor or at the lavatory. If at step 630, no unusual activity is determined, then at step 640 the compression activity is performed. If a threshold is not surpassed or reached such an anti-pinch current threshold (i.e., sensing a resistive force or an obstacle in the compressing operation), the compression action is continued. If the anti-pinch threshold is reached, then at step 650, the trash flap controller is updated with this data and can be configured to place the compressor in a hold state until the compressor controller reports it has reached its default position. For example, an interrupt signal may be sent to the trash flap to command an open action. At step 665, if the plate of the compressor has reached its default position, then the distance moved is calculated from the plates initial position at step 665 to its current position and this data is sent to a central controller to display the bin level (i.e., how filled the trash receptacle is) or to be display in a graphical user interface that shows a representation (i.e., bar graph or real-time simulated trash receptacle image being filled) with the bin level and available space in the receptacle. At step 670, the trash flap controller is updated when the compacter plate has returned to it default position or reached an initial position. FIG. 6B illustrates a flow chart 675 of a manual actuation process of the trash receptacle. At step 680, a button configured with the trash receptacle or remote to the trash receptacle is actuated to initiate a trash compression action. At step 685, once activated, data is capture for a period of time (x milliseconds) for detections by the PIR motion and temperature sensors configured with or near the trash receptacle. At step 690, similar to the automated process of FIG. 6A, detection actions are caused for detecting unusual activity such as unusual motion or temperatures exceeding a threshold near or at the trash receptacle. If such data of unusual activity is detected, an appropriate alert is generated and/or sent to a central controller to the crew directly. If no unusual activity or temperatures are detected (i.e., the trash compressor is deemed to acting normally), then the flow proceeds to step 700 to perform a compression action. If at step 705, the anti-pinch threshold during the compressor compression action is reached, then at step 710 the re-positioning the compressor plate occurs back to the initial or default position. If at step 715, it is determined that compressor plate has reached its default or initial position, then at step 720 (like step 665 of FIG. 6A), the distance is calculated of movement of the compressor plate from an initial position to a position where the current threshold was detected to determine available space of the trash receptacle and whether it needs to be emptied. At step 725, the controller that operates the trash flap notifies the trash controller that its plate has reached or returned to its initial or default position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods, and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling a compression action of a trash receptacle in an aircraft lavatory, the system comprising:
   a carriage assembly coupled to a first actuator and disposed in a housing of the trash receptacle, wherein the housing defines an interior volume to receive trash in the trash receptacle;
   a plate coupled to the carriage assembly in the interior volume of the housing, wherein the plate is configured to conform with a diameter of an interior of the housing, wherein the plate is configured to move from a retract position by the carriage assembly to a variable position in the housing, wherein, in response, to a command from a controller upon closure of a flap coupled to the housing, the first actuator is configured to cause the carriage assembly to vertically move the plate to the variable position to exert a force on a space in the interior volume that is uncompressed, wherein the space is configured between the variable position of the plate and a bottom of the interior volume in the housing, wherein the space is reduced by movement of the plate causing the compression action to the trash in the space to cause an increase in space available in the interior volume of the trash receptacle for a subsequent deposit, wherein the controller is configured to command the first actuator to cause the compression action in response to a detection by a lavatory sensor of an ignitable material in a trash deposit in the trash receptacle to deplete a volume of air in the interior volume of the trash receptacle for consumption by the ignitable material; and
   a lavatory occupancy sensor electrically coupled to the controller, wherein the controller is configured to command the first actuator to move the plate to the retract position after the compression action and to maintain the flap in a closed position in response to the lavatory occupancy sensor reporting a vacancy of the aircraft lavatory, wherein the controller is configured to command the first actuator to perform a closing actuation in response to a door of the aircraft lavatory changing from locked to unlocked and then is configured to command the first actuator to perform the compression action of the trash deposit.

2. The system of claim 1, wherein the flap is configured to be pivotable between at least an open position and the closed position relative to accessing an opening of the trash receptacle, wherein a second actuator is coupled to the flap; and the controller electrically coupled to the second actuator, wherein the controller is configured to command the second actuator to perform at least one of an opening actuation to pivot the flap to the open position and the closing actuation to pivot the flap to the closed position, and wherein the controller is configured to command the second actuator to perform a first action of the closing actuation in response to a passenger exiting the aircraft lavatory, and to perform a second action via the first actuator of the compression action to compress the trash in the trash receptacle, to increase space available in the interior volume of the trash receptacle for the subsequent deposit.

3. The system of claim 1, wherein the ignitable material comprises a set of ignition sources comprising at least a vaping device or a cigarette.

4. The system of claim 1, further comprising:
   an anti-pinch mechanism that is configured with a threshold indicating a cut-off of the compression action.

5. The system of claim 4, further comprising a door sensor of the door of the aircraft lavatory, wherein the door sensor is electrically coupled to the controller and the controller is configured to command the second actuator to maintain the flap in the closed position until at least a completion of the compression action or in response to the door sensor reporting the door being unlocked.

6. The system of claim 5, further comprising a proximity sensor electrically coupled to the controller, wherein the controller is configured to determine a false detection from the proximity sensor that is proximate to the flap of the trash receptacle of an object proximate to the flap of the trash receptacle based on the lavatory occupancy sensor reporting the vacancy of the aircraft lavatory, and is configured to proceed with the compression action of the trash deposit in the trash receptacle when the aircraft lavatory is unoccupied.

7. The system of claim 6, further comprising:

in response to the controller determining that the force translated to the space containing the uncompressed trash translates to movement of the plate by the carriage assembly less than a pre-determined amount based on a threshold current associated with operation of the anti-pinch mechanism, the controller is configured to cease actuation of the carriage assembly to move the plate to the retract position.

8. The system of claim 7, wherein the second actuator is a linear actuator for operation of the flap, and wherein the first actuator is a ball-and-screw actuator for operation of the plate to move the plate to the variable position.

9. The system of claim 8, wherein the proximity sensor is at least one of an infrared sensor and a photoresistor sensor.

\* \* \* \* \*